Figure 1:
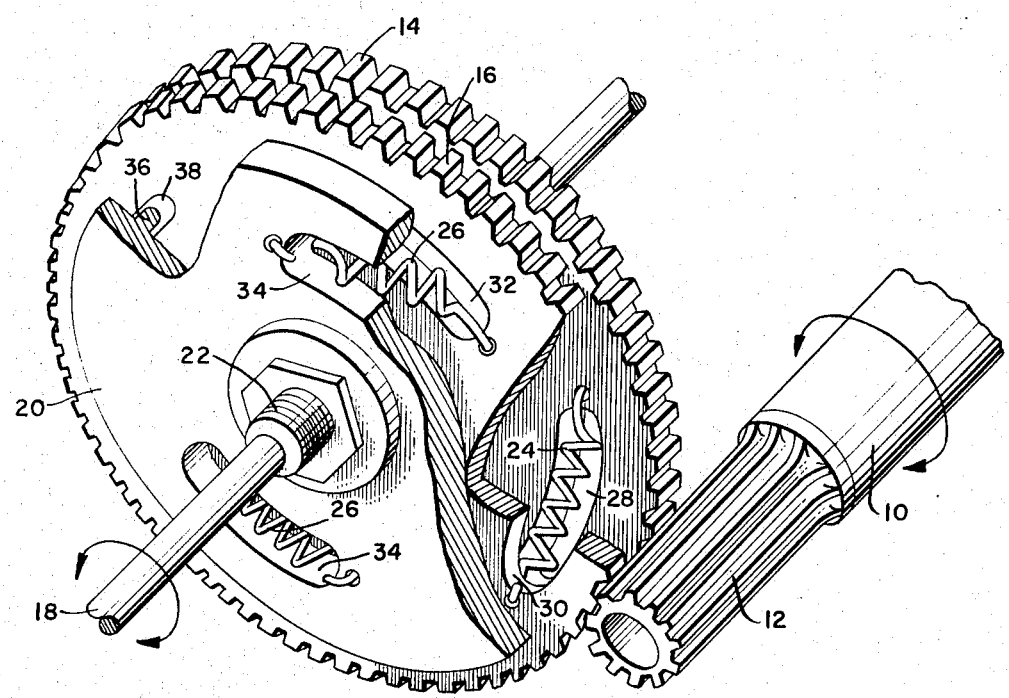

Dec. 26, 1967   L. J. VEILLETTE ET AL   3,359,819
BIDIRECTIONAL STEP TORQUE FILTER WITH ZERO
BACKLASH CHARACTERISTIC
Filed April 25, 1966

INVENTORS
Leo J. Veillette
Seth R. Williams &
Ralph L. Baker

BY

ATTORNEYS

3,359,819
BIDIRECTIONAL STEP TORQUE FILTER WITH ZERO BACKLASH CHARACTERISTIC

Leo J. Veillette, Lanham, Seth R. Williams, Seabrook, and Ralph L. Baker, Baltimore, Md., assignors to the United States of America as represented by the Administrator of the National Aeronautics and Space Administration
Filed Apr. 25, 1966, Ser. No. 545,805
5 Claims. (Cl. 74—409)

The invention described herein was made by employees of the United States Government and may be manufactured and used by or for the Government for governmental purposes without the payment of any royalties thereon or therefor.

The present invention relates generally to a gearing system; and more particularly to a gearing system capable of eliminating backlash and filtering input torque fluctuations from a high inertia load.

In the application of a power source, such as a stepping motor to drive a relatively large inertia load, it is desirable to eliminate input torque fluctuations and components of backlash within the gear train to obtain a smoothed torque at the output of the system. In the space sciences the elimination of such disturbances is important in obtaining maximum efficiency from the performance of the spacecraft. For example, solar panels and parabolic arrays adapted to collect the sun's energy and convert it to electrical energy must be constantly aligned with the sun to achieve maximum efficiency. The system which provides this alignment must be free from unnecessary angular fluctuations and overshoot and must be effective in both directions of rotation.

It is therefore an object of this invention to provide a gearing system capable of filtering torque fluctuations and eliminating backlash in both directions of rotation of the input.

Another object is to provide a gearing system capable of filtering torque fluctuations and eliminating backlash while at the same time functioning as a gear reduction system over an appreciable range of gear ratios.

A further object of the invention is the provision of a gearing system having torque filter and antibacklash characteristics derived from single input and output means without the necessity of intermediate idler means.

Still another object is to provide a device as above described which is failsafe in the transmission of driving torque.

Briefly stated, in accordance with one embodiment, the invention comprises a gearing system including an input shaft and an output shaft, driving means fixed to the input shaft, and a pair of driven gears mounted freely for rotation on the output shaft and interconnected through elastomeric elements to a flange fixed on the output shaft in such a manner that variations in input torque are absorbed to provide a smoothed torque on the output shaft.

Figure 2:
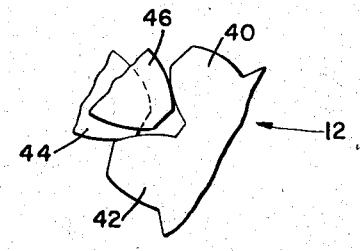

The exact nature of this invention as well as other objects and advantages thereof will be readily apparent from consideration of the following specification relating to the annexed drawings in which:

FIGURE 1 shows an isometric view, partly in section, of a preferred embodiment of the invention; and FIGURE 2 is an enlarged view of the engagement of the spur gears on the output shaft with the teeth of the pinion gear on the input shaft.

Referring now to FIGURE 1, there is shown an input shaft 10 which carries at one end the pinion or driving gear 12 which is normally in mesh with two spur gears 14 and 16 both mounted to turn freely on the output shaft 18. Also mounted on the output shaft is the hub or flange 20 which is fixed to the shaft as at 22. The hub and spur gears 14 and 16 are interconnected through coil springs 24, and 26. Spring 24 connects gear 14 to gear 16 by conventional means and is accommodated in slots 28 and 30 formed in the respective gears. Slots 32 and 34 formed in the gear 16 and the hub 20 carry the second springs 26 which connect the hub to the latter gear. Note that two complementary springs 26 are shown, and in the illustrated embodiment a second spring 24 (not shown) is similarly situated 180 degrees from the spring 24 seen in FIGURE 1. This complementary placement aids in reducing bearing friction but it is to be understood that such spring pairs are not essential to an operable device, and that one spring for each connection would be effective to accomplish the purposes of this sytsem.

A pin 36 projects axially from the hub 20 and rides in the circumferential slot 38 in the gear 16. When the teeth of spur gears 14 and 16 are meshed with the teeth of pinion gear 12 spring 24 is in tension and acts to bias the spur gears in opposite directions of rotation. The second coil spring 26 is also placed in tension and assuming no load at the output shaft the axial pin 36 will normally engage one end of the slot 38 as shown.

FIGURE 2 shows on an enlarged scale the mesh of gears 14 and 16 with the pinion gear 12 carried by the input shaft 10. Spring 24 which is pretensioned before the gears are meshed forces the engaging tooth 46 of gear 16 against the top tooth 40 of the pinion. At the same time the engaging tooth 44 of spur gear 14 is forced against the bottom tooth 42 of the pinion. The driven gears are thus effectively biased in opposite directions about the output shaft 18, giving the device an antibacklash characteristic.

In operation when the input shaft 10 is rotated in a clockwise direction torque is transferred directly to gear 14 which then drives gear 16 through spring elements 24. Any torque pulsations are filtered by the springs 24 since the pinion does not directly drive gear 16 in this direction of rotation; and gear 16 is free to rotate slightly with respect to the pinion. The hub 20 and output shaft 18 are then driven counterclockwise with a smoothed torque by the engagement of pin 36 in the end of slot 38. When the input shaft is rotated counterclockwise it drives gear 16 directly. Gear 16 then drives the hub through springs 26 which filter out pulsations in the input torque. Note that in this direction of rotation the pin 36 is free to move a limited distance in the circumferental slot 38 and therefore gear 16 when driven clockwise will not drive the flange 20 directly but only through springs 26.

The device thus comprises a bidirectional step torque filter and anti-backlash driving system capable of filtering small angular displacements, less than one arc-minute (theoretically zero). In this application the elastic elements serve as enrgy storage devices. This permits conservation of power in step motor assemblies which drive high inertia loads. Additionally, the system can provide gear reduction for any reasonable gear ratio, simply by selection of the desired size pinion and spur gears. No intermediate idler elements are necessary. Further, the pin and slot connection between the gear 16 and hub 20 makes the system failsafe with respect to the elastic elements for should either or both of the elastic elements fail gear 16 would still drive the hub through pin 36.

The system is also adjustable in that by rotating the gear 14 with respect to gear 16 before placing both gears in mesh with the driving pinion the biasing tension of springs 24 may be preselected according to the angular displacement of the two gears. Of course, the number and size of the springs used will depend upon the magnitude of the anticipated torque fluctuations. Also, elements other than coil springs could be employed as long as the necessary elastomeric qualities are present.

What is claimed is:
1. A gearing system for providing a smooth torque on an output shaft in response to a variable torque on an input shaft comprising:
   a driving gear,
   an output shaft,
   first and second driven gears meshed with said driving gear and mounted for free rotation on said output shaft,
   means for biasing said first and second driven gears in opposite directions of rotation on said output shaft,
   and means for rotating said output shaft in response to rotation of one of said driven gears.

2. A gearing system as set forth in claim 1 wherein the means for biasing said first and second driven gears comprises elesatic means having one end conected to said first driven gear and the other end connected to said second driven gear such that said elastic means is placed in tension when the driven gears are in mesh with said driving gear.

3. A gearing system as defined in claim 2 wherein said means for rotating said output shaft includes a flange fixedly mounted on said output shaft, and a second elastic means having one end connected to said second driven gear and the other end connected to said flange.

4. A gearing system as defined in claim 3 wherein said flange carries an axially extending pin, and said second driven gear has formed therein a circumferential slot to accept said pin.

5. A gearing system as defined in claim 4 wherein said pin normally contacts one end of said slot and is free for limited movement within said slot in one direction of rotation of said driven gears.

References Cited

UNITED STATES PATENTS

| | | | |
|---|---|---|---|
| 2,310,232 | 2/1943 | Hale | 74—440 |
| 2,343,110 | 2/1944 | Hale | 74—440 |
| 2,680,386 | 6/1954 | Selsted | 74—574 |
| 3,143,899 | 8/1964 | York | 74—409 X |
| 1,449,903 | 3/1923 | Leow | 74—440 |
| 1,608,050 | 11/1926 | Bailey | 74—440 |
| 1,648,715 | 11/1927 | Bean | 74—440 |
| 2,663,198 | 12/1953 | Cairnes | 74—409 |
| 2,966,806 | 1/1961 | Luning | 74—409 |

DONLEY J. STOCKING, *Primary Examiner.*

LEONARD H. GERIN, *Assistant Examiner.*